Aug. 15, 1961   F. GROSSE ET AL   2,996,298
CHILD'S ROCKING DEVICE
Filed April 13, 1959   3 Sheets-Sheet 1
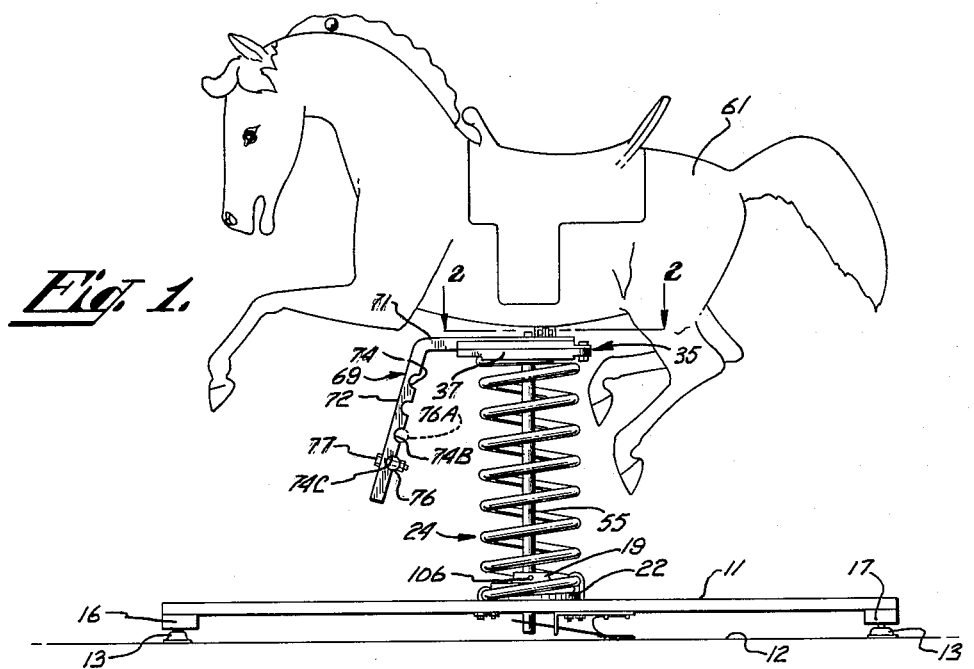
*Fig. 1.*
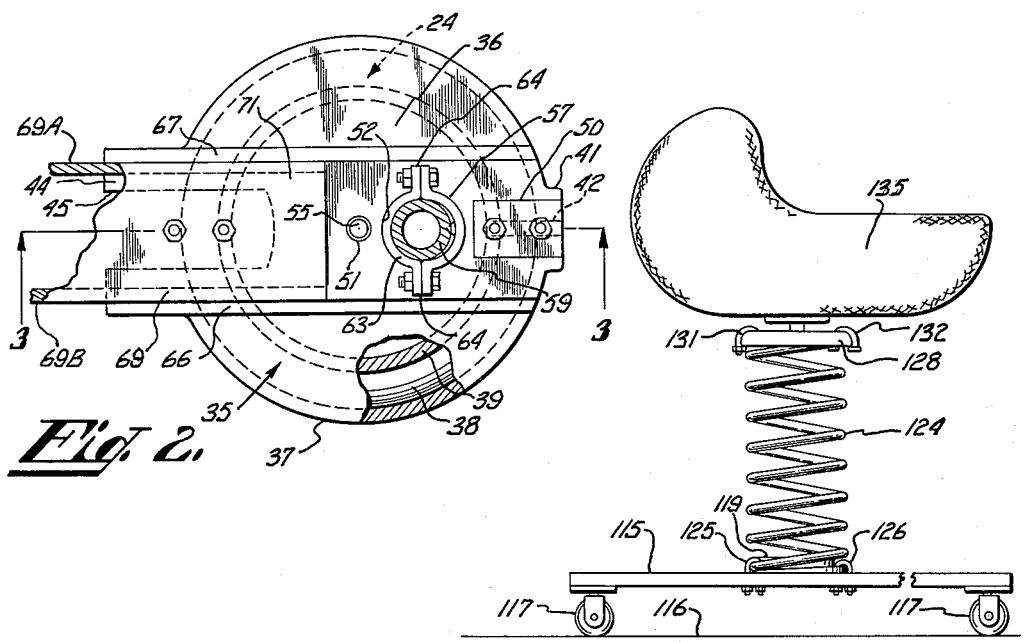
*Fig. 2.*   *Fig. 3.*
INVENTORS
FRANK GROSSE
BY CHARLES H. BARNES
Christie, Parker & Hale
ATTORNEYS Aug. 15, 1961   F. GROSSE ET AL   2,996,298
CHILD'S ROCKING DEVICE
Filed April 13, 1959   3 Sheets-Sheet 2
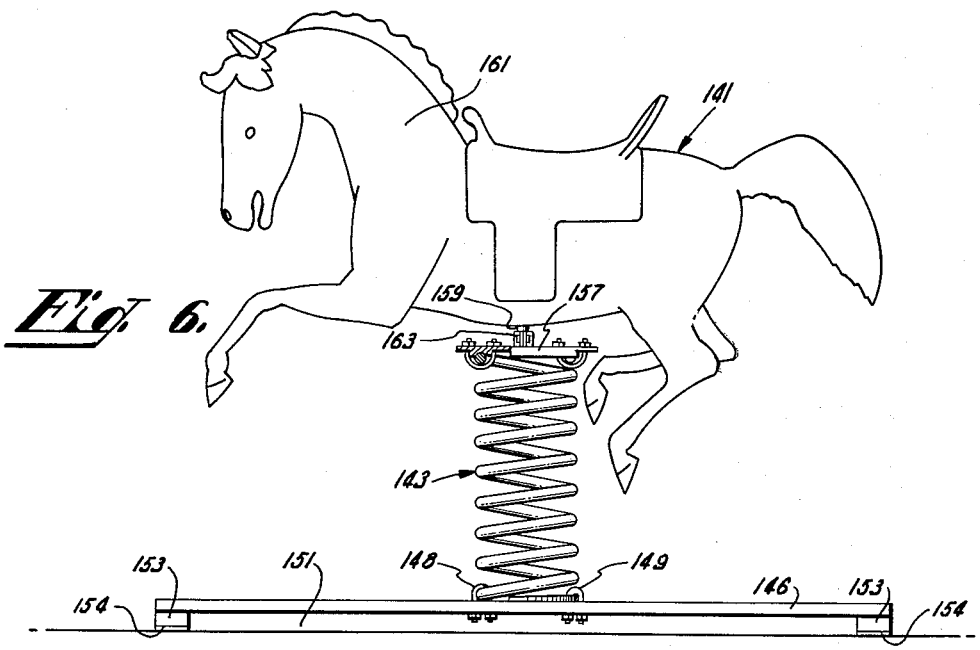
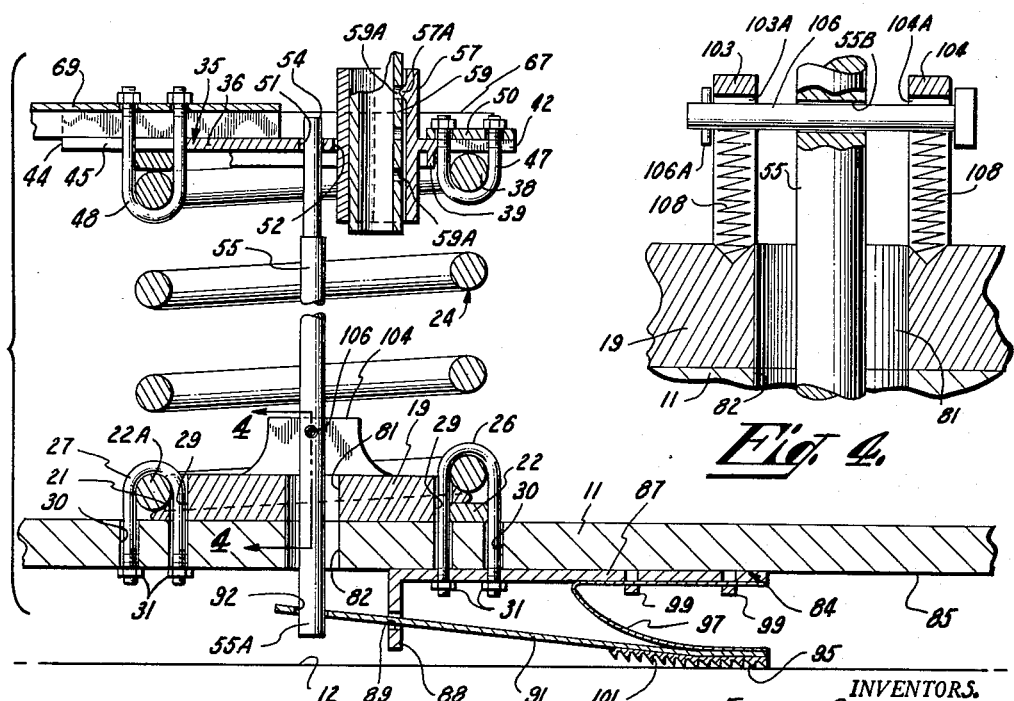
INVENTORS.
FRANK GROSSE
BY CHARLES H. BARNES
ATTORNEYS Aug. 15, 1961  F. GROSSE ET AL  2,996,298
CHILD'S ROCKING DEVICE
Filed April 13, 1959  3 Sheets-Sheet 3

INVENTORS.
FRANK GROSSE
BY CHARLES H. BARNES
Christie, Parker & Hale
ATTORNEYS

United States Patent Office 2,996,298
Patented Aug. 15, 1961

2,996,298
CHILD'S ROCKING DEVICE
Frank Grosse, 2512 Silver Ridge Ave., Los Angeles, Calif., and Charles H. Barnes, Glendale, Calif.; said Barnes assignor to said Grosse
Filed Apr. 13, 1959, Ser. No. 805,815
4 Claims. (Cl. 272—52)

The invention relates to rocking devices for infants or children, and more particularly to rocking devices such as hobby horses.

Motion toys are perennial commercial successes. As in most industrial products the aim in designing playthings for children is to produce apparatus which is not only appealing to the buying public for its merits but which can be manufactured easily and sold at a competitive price. One of the primary toys is one in which the infant or child is himself moved on the toy. Various moving devices such as hobby horses, cradles and wheeled toy vehicles dominate the toy market.

The hobby horse has great appeal to smaller children. The motion imparted is pleasant and the horse motif is ideally suited to childish imaginations.

However, one difficulty with most hobby horses of conventional design has been lack of realism. Horses with rocking chair runners, spring suspended horses in external cradles, etc., interfere with the rider's activity and his desire for realism. Therefore, many attempts have been made in the past to mount rocking devices such as hobby horses on a single pedestal. Exemplary of previous attempts to achieve realistic motion and appearance are Patents Nos. 2,746,754 and 2,832,594 issued respectively to F. W. Martel and G. D. Kight on May 22, 1956 and April 29, 1958, respectively.

We have invented an improved rocking device for children which has met with large initial enthusiasm. The apparatus of the invention has utility not only as a device using a hobby horse as a child support member but may also mount other types of support members such as a bassinet. The invention contemplates a rocking device to be oscillated by the motion of a child thereon. The inventive apparatus may comprise a base, a spring member extending upwardly from the base and a child support member fixed to the upper end of the spring member. Means are provided which induce oscillatory motion of the spring member, in response to the child's motion, in a substantially consistent path. Preferably the inducing means comprises a vertically oriented compression spring and means which couple the compression spring to the child support member and the base respectively at points on the spring aligned with the path of major oscillation.

While the compression spring is preferable, a double cantilever spring may be utilized effectively. The cantilever spring is fixed to the base so that the major extent of each leaf of the cantilever spring is transverse to the path of major motion of the child support member.

A preferred embodiment of the invention additionally comprises means for imparting substantially linear motion to the rocking device along the surface upon which the base rests. The means may comprise an actuating rod removably engaged at one of its ends to a coupling plate which links the support member and the spring. The end of the actuating rod remote from the support member extends through an aperture in the base to a point below the base but above the support surface. A pivot axle flexibly journalled in a base plate pivotally mounts the actuating rod. The bottom turns of the helical spring member are engaged about the base plate.

The bottom end of the actuating rod engages a friction clutch mounted to the base so that oscillatory motion of the actuating rod imparts a substantially horizontal motion to the friction clutch. Means are provided whereby the friction clutch is biased against the base support surface to transmit a thrust thereto.

We have found that a spring of sufficient diameter and height is induced to oscillate in a substantially consistent direction under the urging of a child on the support member. When the support member is a hobby horse, the natural tendency of a child on the horse is to rock back and forth along the longitudinal axis of the horse. A properly proportioned helical spring or a properly oriented cantilever spring may be thus induced into an oscillatory cycle of motion substantially in a plane. As in previous spring mounted hobby horses, one component of the motion induced by movements of the rider is a force tending to compress a helical spring. This downward motion in addition to the rocking motion gives a realistic "ride" to the child on the support member.

A bassinet may be used as the child support member. While a child of the size and age normally accommodated in a bassinet is not sufficiently co-ordinated to induce regular motion, a soothing rocking motion can be externally induced to the pleasure of the child. The child's activity can induce random rocking.

In the preferred form as a hobby horse, the apparatus of the invention has proved very successful as therapy for spastic or otherwise unco-ordinated children. The muscular action necessary to set the rocking device in motion is not a complicated one, but does require mental concentration on muscular activity to induce the motion. Since the activity is an enjoyable one, the child is impelled to make a greater effort to accomplish the exercise than he would in utilizing normal therapeutic devices. These and other advantages of the invention are apparent in the following detailed description and drawing in which:

FIG. 1 is a side elevation of a preferred embodiment of the invention;

FIG. 2 is a fragmentary plan section taken along line 2—2 of FIG. 1;

FIG. 3 is a fragmentary sectional elevation taken along line 3—3 of FIG. 2;

FIG. 4 is a fragmentary sectional elevation taken along line 4—4 of FIG. 3 and detailing the flexible pivot mount of the actuating rod;

FIG. 5 is a fragmentary side elevation of an alternate embodiment of the invention in which the support member is a bassinet;

FIG. 6 is an additional alternate embodiment of the invention shown in side elevation and partly broken away;

Figure 7:
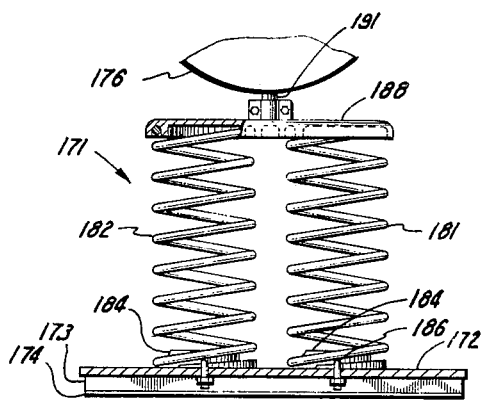
FIG. 7 is a fragmentary sectional elevation partly broken away and showing a compound spring member.

The preferred embodiment of the invention is illustrated in FIGS. 1 through 4. In those figures a rectangular base 11 is supported above a base support surface 12 on a plurality of gliders 13 fixed in end rails 16 and 17 secured to the bottom surface of the base. A circular base plate 19 having a substantially helical groove 21 about its periphery engages the bottom partial turns 22, 22A of a heavy helical compression spring 24. The helical spring is secured to the base by fastening means such as a pair of U-bolts 26, 27 each of which loops over the bottom turns of the compression spring. One leg of each U-bolt passes through a hole 29 in the base plate. Both legs of the U-bolts pass through holes 30 in the base and are fixed in position by nuts 31. The U-bolts thus fix both the spring and the base plate to the base.

The compression spring extends vertically upwardly from the base and the base plate to a coupling plate 35. The configuration of the coupling plate is best seen in FIGS. 2 and 3. The plate has a horizontal plate disc 36 having a partial downwardly turning rim 37. The downwardly turning rim encompasses an upper turn 38 of compression spring 24. An annular centering rib 39 extends downwardly from the plate disc and locates the upper turn between the centering rib and rim 37. A small flange 41 extends outwardly from a peripheral edge of the disc. A slot 42 extends inwardly from the outer edge of the flange to a point adjacent annular rib 39. Diametrically opposite flange 41 is a larger support flange 44. A slot 45 extends inwardly from the outer edge of flange 44 to a point beyond rib 39. The flatted upper turns of the compression spring are secured to the coupling plate by fastening means such as a pair of U-bolts 47, 48. U-bolt 47 extends upwardly in slot 42 of flange 41 and through a nut retainer plate 50 which bridges slot 42.

The plate disc has two holes 51, 52 extending downwardly through it. Hole 51 is preferably located centrally of the disc and engages removably with a top end 54 of an actuating rod 55 whose function will be described later. Hole 52 in the disc is defined in part by a semi-cylindrical sleeve 57 preferably formed integrally with the disc and projecting vertically from the disc in both directions. Hole 52 and the sleeve are displaced away from the vertical axis of the compression spring.

A mounting post 59 extends downwardly from a child support member 61. In the preferred embodiment the child support member is a hobby horse figure preferably made of a resilient material such as plastic or rubber. Post 59 is fixed to a metallic saddle element (not shown) within the horse or support member. The post is at the approximate balance center of the horse. The horse is a commercially obtainable product, and details of its further construction are not described. An arcuate binding collar 63 having flanges 64 is secured conventionally as by bolts to sleeve 57 to clamp post 59 in place with respect to the coupling plate 35. The child support member is thereby secured to an end of the compression spring remote from the base.

A detent knob 57A may be formed on the inner periphery of sleeve 57. The detent knob is adapted to register in any one of a plurality of apertures 59A in the side wall of the post. The child support member is thus adjustable vertically with respect to the coupling plate, and fixed against rotation.

A pair of spaced parallel ribs 66, 67 extend across the top of disc 36 and flange 44. The ribs serve to strengthen the disc and also to mount slidably a foot support bracket 69 to the plate. The foot support bracket is a substantially L-shaped channel iron clamped in position between the ribs by U-bolt 48. The U-bolt extends upwardly through slot 45 above the surface of plate disc 36. As can be seen in FIG. 1, the foot support bracket has a horizontal portion 71 and a substantially vertical portion 72. The flanges 69A, 69B of the bracket have aligned indentations 74 through 74C. Indentation 74C holds a foot support bar 76 near the lower end of bracket portion 72. The bar is secured to the bracket by conventional means such as nut and bolt assembly 77. The bar extends horizontally outwardly beyond the flanges of the foot support bracket to form a step or foot rest for the rider of the hobby horse. Padded protectors may be positioned on the ends of the bar as a safety precaution. The foot support bar 76 may be positioned in any of the indentations and is shown positioned in indentation 74B at dotted lines 76A of FIG. 1.

The foot support bracket and bar are illustrative of one form of apparatus usable with the rocking device of the invention. Other foot support assemblies are equally adaptable to the device. Articulated stirrups may be used, but are not considered as desirable since the age of a child using a hobby horse is usually such that a rigid support is preferable.

While the rocking device of the invention is usable without a foot support, the support affords simple means for a child to reach the saddle of the horse unaided and gives a purchase point for the rider when putting the device in motion.

Preferably means are provided for moving the rocking device of the invention with respect to the surface upon which it rests. A preferred arrangement for such movement is shown in FIGS. 1 through 4. The previously mentioned actuating rod 55 is removably engaged with coupling plate 35. The rod extends downwardly through hole 51 of the coupling plate and through holes 81 and 82 of the base plate and base respectively. These holes are generally aligned with the central axis of the static compression spring 24. A lower end 55A of the actuating rod extends into the space between the bottom of the base and the support surface upon which the base rests. The amount of space is dependent upon the type of floor contacting member the base has. In FIG. 1 as previously indicated, gliders 13 are used. If the hobby horse is one in which the device is not movable across the support surface in response to oscillation of the child support member and the spring, a friction pad may be used to contact the floor. Such a device is illustrated in FIG. 6.

A support bracket 84 is fastened by previously described U-bolt 26 to bottom surface 85 of the base. The bracket has a first leg 87 extending along the base surface. A second leg 88 extends downwardly from the base surface a short distance from the actuating rod. The displacement between the rod and the second leg is generally along the path of movement of the child support member.

Second leg 88 has a slot 89 through which a creeper arm 91 is slidable. An elongated second slot 92 in one end of the creeper arm is removably engaged with the actuating rod. A clutch pad 95 is fixed to the opposite end of the creeper arm. The end of the creeper arm bearing the clutch pad is biased against the support surface by a leaf spring 97. The leaf spring is mounted to the bracket 84 in loops 99 preferably punched from the material of the bracket itself. The leaf spring is slidable within the loops so that while its vertical position is maintained the leaf spring may be easily removed by horizontal movement through the loops.

The clutch pad 95 may take many forms. The preferred clutch pad illustrated in FIG. 3 has a plurality of biting ridges 101 which are flexible in one direction and more rigid in the other direction because of their configuration.

Two base plate flanges 103, 104 extend upwardly from the base plate on either side of hole 81. A pivot axle 106 extends through vertically elongated apertures 103A, 104A in the base plate flanges. The axle also extends through a hole 55B in the actuating rod. The pivot pin extends transversely to the longitudinal axis of the horse or other child support member so that the actuating rod may pivot about the axle in substantially the same plane as the oscillatory motion of the horse. Pivot axle 106 extends through apertures 103A, 104A and rests upon compression springs 108 each lodged within a base plate flange. The springs are sufficiently strong to maintain the pivot axle near the top of the elongated apertures. Thus the actuating rod may pivot in response to oscillation of the child support member and the spring member of the rocking device and adjust to random effects of thrust against the support surface by clutch pad 95.

Referring again to FIG. 3, it can be seen that forward thrust of the support member is transmitted by mounting post 59 to the coupling plate and the spring member 24. Forward rocking motion is thus transmitted to the actuating rod, causing its lower end 55A to move rearwardly, moving the creeper arm and pushing clutch pad 95 against the support surface. The ridges 101 of the clutch pad thus exert a strong friction force against the support surface with a resultant forward motion of the rocking device itself. When the child support member is rocked rearwardly the lower end of the actuating rod moves forwardly and pulls creeper arm 91 and clutch pad 95 along the support surface. Ridges 101 are more flexible in this direction of movement and tend to fold up and slide across the surface rather than to grip the surface. Thus, motion in a single direction may be achieved.

If the rider leans sideways in the saddle while the hobby horse is rocking back and forth, the actuating rod oscillates in a plane at an angle to the major rocking motion. This tends to cant the creeper arm with respect to the longitudinal axis of the horse and push the rocking device at an angle to that axis. Ocillation and resultant angular thrusts of the creeper arm accomplish a turn of the devise. Angular displacement of the actuating rod is made possible by the flexible pivot mounting described heretofore with respect to FIG. 4.

We have found that a heavy compression spring is most suitable for a rocking device such as that described. The presently preferred spring member is a helical coil spring having a wire diameter of approximately $11/16$ of an inch and a coil outside diameter of $5\frac{1}{8}''$. The free length of the spring is approximately 13" and has 9 complete coils. Such a spring when fastened at diametrically opposed points to the base tends to flex freely in the plane of the line through the fastening points.

The support member has been subjected to riders up to 85 pounds. The spring is sufficiently sturdy to accommodate such weights well within its safety factor. No appreciable sidesway is induced under this weight load by a generally longitudinal rocking motion by the rider. However, sidesway can be induced if desired by a substantial leaning position with respect to the vertical axis of the spring member. Children of much smaller size (approximately one year old) have no trouble setting the above described apparatus into oscillatory motion along the longitudinal axis of the support member.

Fastening the coil spring at points generally along the path of major oscillation results in improved performance over devices previously employed.

While the preferred embodiment has been described with respect to FIGS. 1 through 4 other embodiments within the scope of the invention are practicable. One such alternate embodiment is illustrated in FIG. 5. In that figure a base 115 supported from a surface 116 by conventional casters 117 has a base plate 119 substantially similar to that described with respect to the embodiment of FIGS. 1 through 4. A relatively heavy compression spring 124 is secured to the base and base plate by U-bolts 125, 126 in the previously described fashion. The compression spring extends upwardly to a coupling plate 128 which receives the upper turns of the compression spring. Once again fastening means such as U-bolts 131, 132 fix the spring to the coupling plate at points disposed along the path of major oscillation. The coupling plate links a support member which may be a bassinet 135 to the compression spring.

The rocking motion along the axis of the bassinet is easily induced. Once set in motion the spring tends to continue rocking for a substantial length of time. The continuing period of the spring is due in part to the basic spring characteristics, but is mainly attributable to the fastening means employed, which lessens the damping effect of the fastenings.

An alternate rocking device 141 is illustrated in FIG. 6 which utilizes a spring member such as a heavy coil spring 143 fastened to a rectangular base 146 by U-bolts 148, 149. The U-bolts fix the spring at points aligned with the path of major oscillation. The base is spaced from a support surface 151 by end rails 153 each having a friction pad 154 fixed to its bottom surface.

The spring member 143 extends vertically from the base. A coupling plate 157 is attached thereto. A mounting post 159 protruding downwardly from the body of a child support member such as hobby horse 161 is secured to the coupling plate by a clamp 163. The clamp may be a part of the coupling plate and perform in the manner described with respect to the coupling plate 35 of FIGS. 2 and 3. The embodiment of FIG. 6 provides a simple rocking device which is held in place on the support surface by the friction pads 154. The device oscillates under urging of a rider in a path whose major component is in line with the fastening means 148, 149. As previously described, oscillation in a path displaced from the line through the fastening means may be accomplished by deliberate body action.

In FIG. 6 the mounting post of the support member is fixed centrally of the coupling plate. The mounting post is conventionally at the balance point of the support member. Such a mounting in the center of the coupling plate is possibly desirable since it simplifies fabrication of the coupling plate. However, better riding characteristics have been observed when the mounting post is displaced rearwardly of the vertical axis of the at rest spring member. This position is illustrated in FIGS. 1 and 3, and has proved generally to result in better "riding" qualities.

Figure 8:
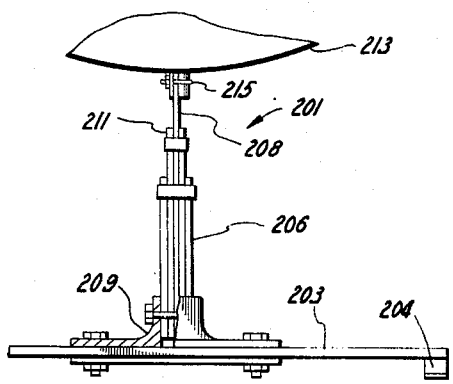
FIG. 8 is a further embodiment of the invention utilizing a cantilever spring member.

The spring members thus far described have been similar helical compression springs. FIGS. 7 and 8 illustrate alternate embodiments of the spring member. In FIG. 7 a rocking device 171 has a base 172 raised from the support surface by end rails such as rail 173 and friction pad 174. FIG. 7 is a transverse section taken normal to the longitudinal axis of a support member 176 shown fragmentarily. A pair of helical compression springs 181, 182 extend vertically from base 172. Each is engaged in its lower turns by a base plate 184. Each base plate and associated compression spring is fixed to the base by fastening means such as the U-bolt 186 of FIG. 7. The U-bolts bind about spaced points on the compression springs substantially parallel to the path of major oscillation of the support member.

The compression springs extend upwardly to a compound coupling plate 188. The spring pair is secured to the compound coupling plate as heretofore described with respect to previous embodiments. The child support member has a depending mounting post 191 which is clamped to the coupling plate.

The embodiment of FIG. 7 utilizes lighter springs than the single coil springs of previously described embodiments. It affords the same compression loading as the prior embodiments but provides easier motion along the horizontal axis of the support member and effectively inhibits sidesway without the use of a relatively heavy spring. Each of the springs is fastened at spaced points parallel to the path of major motion for more effective oscillation.

In FIG. 8 a rocking device 201 having a base 203 supported above the support surface by padded rails 204 utilizes a spring member 206 which is a multi-leafed cantilever spring. The spring member has a central leaf 208 which extends vertically from a mounting bracket 209 secured to the base. Lesser spring leaves 211 are clamped to the central leaf on either side in conventional fashion to provide the double cantilever spring. A child support member 213 is fixed by a U-bolt 215 to the top of central leaf 208. It is obvious that a cantilever spring which is oriented so that its laminations stack in the path of major oscillation will be most effective in that direction. Twist and sidesway will be substantially eliminated. Such a spring member as the member 206 is effective in providing an arcuate oscillatory motion. However, since it lacks vertical compressibility the ride effect is not as desirable as with rocking devices using helical compression springs. A degree of side motion can be achieved if the mounting bracket 209 is secured to base 203 by means of compression springs mounted between the bottom of the bracket and the top of the base in a manner not shown.

Figure 9:
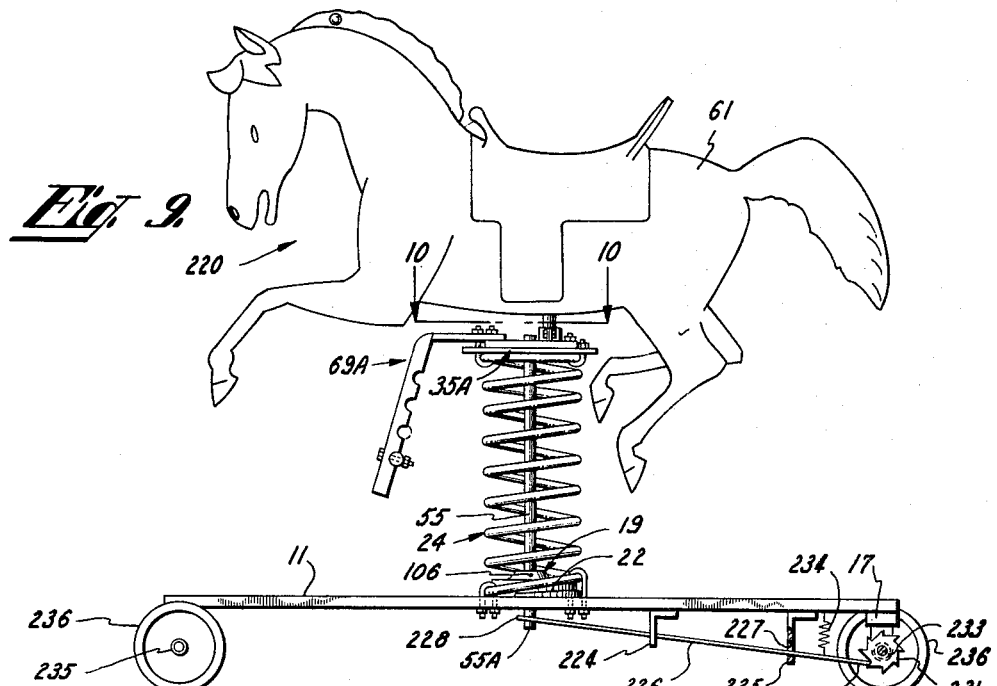
FIG. 9 is a still further alternate embodiment of the invention illustrated in side elevation.
Figure 10:
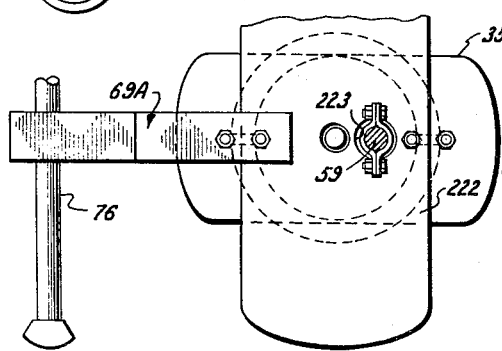
FIG. 10 is a plan section taken along line 10—10 of FIG. 9.

FIGS. 9 and 10 illustrate a rocking device 220 substantially similar to the embodiment described in conjunction with FIGS. 1 through 4. Similar parts have been given reference characters identical to those in FIGS. 1 through 4. A base 11 to which a base plate 19 is secured supports a spring member 24 and a coupling plate 35A to which a child support member 61 is secured. An actuating rod substantially identical to rod 55 of FIG. 1 is removably engaged at its top end with the coupling plate. The plate supports a foot support bracket 69A and a foot platform 222.

The child support member of the embodiment of FIG. 9 is mounted rearwardly of the center of the compression spring axis. As in FIG. 1, the spring member is secured to the coupling plate and to the base plate by fastening means such as a plurality of U-bolts.

As can be seen in FIG. 10, foot platform 222 is fixed directly above coupling plate 35A. The foot platform has an aperture 223 through which the conventional mounting post 59 of the hobby horse 61 and the clamping sleeves 57, 63 of the coupling plate extend. The foot platform is secured to the coupling plate by the inner legs of each of the fastening U-bolts.

The foot platform extends about seven inches on each side of the mounting post and affords a foot rest for smaller riders. The position of the foot platform near the center of the spring member and rearwardly of the normal foot support bracket enables larger riders to use the previously described foot support without interference by the foot platform.

The foot platform has a particular utility for therapeutic use. Small children who have trouble making the transition from creeping to walking sometimes are muscularly unable to fully straighten the leg at the knee. Such children may be put on the device of FIG. 9 and the toes will normally rest on the foot platform. In order to impel themselves upon the hobby horse they must exert a pressure against the foot platform. A greater degree of oscillation results if the entire foot is pressed against the platform. The child gradually learns to press more of the foot downwardly into contact with the platform and consequently stretches the leg muscles and straightens the leg. Thus a muscular adaptation is made which enables the child to develop the leg condition necessary to walking.

Actuating rod 55 is pivotable about a flexibly mounted pivot axle 106 journalled in the base plate as previously described with respect to the embodiment of FIG. 1. Both of the embodiments have a cotter key 106A which may be removed from the pivot axle. When the cotter key is removed the axle may be withdrawn from the actuating rod and since the rod is removably engaged with the coupling plate, it may now be removed from the rocking device for packaging.

In the embodiment of FIGS. 9 and 10 a pair of support brackets 224, 225 depend from the lower surface of base 11. The brackets are spaced from each other along the length of the base and support a horizontal push rod 226. The push rod is slidably mounted with respect to bracket 224 and is mounted in an aperture 227 in bracket 225 to permit some degree of vertical freedom. The push rod is removably engaged at an end 228 to the lower extension 55A of the actuating rod. A push rod end 229 remote from the actuating rod is adapted to engage the cogs of a ratchet wheel 231 fixed to an axle 233 journalled from rear rail 17 of the base. An extension spring 234 is fastened to the base and adjacent end 229 of the push rod. The spring exerts a force tending to lift the push rod and insures that the push rod engages the ratchet wheel after each rearward stroke of the push rod. A similar axle 235 is mounted to the front of the base. Each axle has a pair of small wheels 236 fixed to its outer ends.

The embodiment of FIG. 9 is capable of movement with respect to the support surface for the base. A rider who rocks on the support member imparts an oscillatory motion to the spring member, the coupling plate and the actuating rod removably engaged with the coupling plate. Lower end 55A of the actuating rod has a regular throw measured from the pivot axle 106. Each forward oscillation of the support member results in a rearward thrust of push rod 226 against ratchet wheel 231. The ratchet wheel in turn rotates rear wheels 236 so that the rocking device moves forward.

The embodiments of both FIG. 1 and FIG 9 have actuating rods which may be removed from the rocking device. Cotter key 106A (see FIG. 4) is first removed from the pivot axle. The pivot axle is then withdrawn from base plate flanges 103, 104. The actuating rod of FIG. 1 is thereby freed to move through creeper arm 91 when the rocking device is turned on its side. The actuating rod of the embodiment of FIG. 9 is similarly removed through the end of the push rod.

The creeper arm and clutch pad of FIG. 1 are removable, together with the actuating rod. A leftward thrust as seen in FIG. 3 slides the spring from loops 99 of bracket 84. A subsequent rightward motion of the creeper arm disengages the arm and the clutch assembly from slot 89 of mounting bracket 87.

The actuating rod may thus be packaged for shipment apart from the other components of the rocking device. The entire embodiment of FIG. 1 is designed so that its various components may easily be disassociated for economical shipment or custom assembly into slightly different models.

The apparatus afforded by the invention is variable within a large range. However, each of the devices within the inventive concept provides a rocking device more realistic in rocking characteristics than previous similar devices. The mounting means, i.e. the coupling plate is adapted to receive many different support members. The preferred embodiment of the invention has utility as both a toy and a therapeutic device. Other usages and modifications of the invention will be obvious to those skilled in the art and can be made without departing from the scope of the invention.

We claim:
1. A rocking device to be oscillated by the motion of a child thereon comprising a base, a helical compression spring extending upwardly from the base of substantial stiffness sufficient to carry without external restraint all loads to be imposed thereon in use of the device and free to oscillate in all directions relative to the base, a child support member, a coupling plate, first fastening means linking the coupling plate to the child support member, second fastening means securing the coupling plate to the top of the compression spring at points on the spring aligned with the path of major oscillation of the device, third fastening means securing the bottom of the compression spring to the base at points in alignment with the path of major oscillation of the device, an actuating rod having one of its ends removably engaged with the coupling plate to oscillate therewith, a flexible pivot mount for removably pivoting the actuating rod adjacent the base, an extension of the actuating rod protruding below the base, and means linked to the extension and adapted to thrust against the base support surface to move the device along said surface in response to actuating rod oscillation.

2. Apparatus in accordance with claim 1 in which the pivot is effected by a pivot axle which is removable from the actuating rod so that the rod may be removed from the device through the bottom of the base.

3. A rocking device to be oscillated by the motion of a child thereon comprising a base, a helical compression spring extending upwardly from the base, a child support member, a coupling plate, first fastening means linking the coupling plate to the child support member, second fastening means securing the coupling plate to the top of the compression spring, third fastening means securing the bottom of the compression spring to the base, an actuating rod having one of its ends removably engaged with the coupling plate to oscillate therewith, a flexible pivot mount adapted to pivot the actuating rod adjacent the base, said pivot mount being removable from the rod, an extension of the actuating rod protruding below the base, and means linked to the extension and adapted to thrust against the base support surface to move the device along said surface in response to actuating rod oscillation.

4. A rocking device to be oscillated by the motion of a child thereon comprising a base, a base plate fixed to the base, a vertically oriented helical compression spring secured to the base plate, a coupling plate secured to an end of the compression spring remote from the base, a child support member fixed to the coupling plate adjacent the top surface thereof so that the balance point of said child support member lies rearwardly of the central axis of the spring at rest, a foot rest supported by the coupling plate, an actuating rod extending vertically through the compression spring and protruding through the coupling plate at its upper end and through the base at its lower end, a pivot axle flexibly journalled in the base plate and extending through the actuating rod, an L shaped mounting bracket fixed to the under side of the base, a creeper arm supported by the mounting bracket to extend horizontally therefrom and engage the lower end of the actuating rod, a leaf spring supported by the mounting bracket so that it exerts a downward thrust against the creeper arm, and a clutch pad fixed at an end of the creeper arm remote from the actuating rod, said creeper arm being so supported that movement of the actuating rod in response to oscillation of the child support member thrusts the creeper arm horizontally to force the clutch pad against the surface supporting the device to impel the device along said support surface.

References Cited in the file of this patent

UNITED STATES PATENTS 2,746,754    Martel _____ May 22, 1956